US005995896A

United States Patent [19]

Depping et al.

[11] Patent Number: 5,995,896

[45] Date of Patent: Nov. 30, 1999

[54] METHODS AND APPARATUS FOR CONTROLLING SHIFTING PROCESSES IN A VEHICLE TRANSMISSION

[75] Inventors: Herbert Depping, Giengen; Friedrich Häberle, Heindenheim; Erwin Rotter, Nattheim; Voker Schempp, Holzmaden; Wilfried Maier, Heidenheim, all of Germany

[73] Assignee: Voith Turbo GmbH & Co. KG, Heidenheim, Germany

[21] Appl. No.: 08/933,168

[22] Filed: Sep. 18, 1997

[30] Foreign Application Priority Data

Sep. 18, 1996 [DE] Germany ........................... 196 38 064

[51] Int. Cl.[6] ...................................................... G06F 17/00

[52] U.S. Cl. ................................ 701/51; 701/54; 701/87; 477/901; 477/133; 477/107; 477/110

[58] Field of Search .................................... 701/1, 51, 52, 701/53, 54, 62, 65, 87; 477/108, 120, 133, 94, 901, 904, 107, 110, 115; 74/335

[56] References Cited

U.S. PATENT DOCUMENTS

| | | | |
|---|---|---|---|
| 4,625,590 | 12/1986 | Müller | 74/866 |
| 5,121,657 | 6/1992 | Asada | 74/866 |
| 5,231,582 | 7/1993 | Takahashi et al. | 364/424.1 |

(List continued on next page.)

FOREIGN PATENT DOCUMENTS

| | | |
|---|---|---|
| 0 352 551 | 1/1990 | European Pat. Off. . |
| 0 417 275 | 3/1991 | European Pat. Off. . |
| 30 18 032 | 11/1981 | Germany . |
| 38 27 091 | 3/1989 | Germany . |
| 40 101 04 | 10/1990 | Germany . |
| 42 04 881 | 9/1992 | Germany . |
| 41 24 549 | 12/1995 | Germany . |
| 195 16 948 | 11/1996 | Germany . |

OTHER PUBLICATIONS

European Search Report on European Patent Application No. 96 10 5976.3, dated Jun. 4, 1997.

Computer Abstract of German Publication No. 30 18 032 (Item B1).

Computer Abstract of German Publication No. 40 10 104 (Item B4).

Computer Abstract of German Publication No. 42 04 881 (Item B6).

Computer Abstract of German Publication No. 41 24 549 (Item B7).

*Primary Examiner*—Jacques H. Louis-Jacques
*Assistant Examiner*—Gertrude Arthur
*Attorney, Agent, or Firm*—Marshall, O'Toole, Gerstein, Murray & Borun

[57] ABSTRACT

A method for the control of shifting processes in a vehicle transmission from an initial gear to the next higher target gear includes the steps of continuously determining the vehicle acceleration (a) and the driven rpm ($n_2$) behind the vehicle transmission. A shifting process is triggered when the acceleration value (a) and the essentially simultaneously recorded driven rpm value ($n_2$) fall on a shifting point which lies on a shifting characteristic ($n_2(a)$) in an acceleration-driven rpm diagram, where the shifting characteristic ($n_2(a)$) has a stepped course with at least two break points (a_max; a_min) and the slope of the shifting characteristic for acceleration values a_min<a<a_max is always smaller than or equal to the slope of the shifting characteristic for acceleration values $a \leqq$ a_min or $a \geqq$ a_max. In other words, the following applies:

$|n_2(a_1)| \leqq |n_2(a_2)|$ where $a_1 \in$ [a_min<a<a_max] and $a_2 \in$ ]a_max<a<∞[ or $a_2 \in$ [0<a<a_min[.

When connecting the vehicle transmission with different axle-drive ratios, the shifting characteristic ($n_2(a)$) with break points (a_max; a_min) is the same for all possible axle-drive ratios.

17 Claims, 8 Drawing Sheets

U.S. PATENT DOCUMENTS

| | | | |
|---|---|---|---|
| 5,235,876 | 8/1993 | Minowa et al. | 74/866 |
| 5,315,514 | 5/1994 | Steeby et al. | 364/424.1 |
| 5,603,673 | 2/1997 | Minowa et al. | 477/110 |
| 5,643,133 | 7/1997 | Minowa et al. | 477/107 |
| 5,672,137 | 9/1997 | Adachi et al. | 477/45 |
| 5,697,864 | 12/1997 | Watanabe | 477/98 |
| 5,803,865 | 9/1998 | Harada et al. | 477/119 |
| 7,470,290 | 11/1995 | Minowa et al. | 477/115 |

METHODS AND APPARATUS FOR CONTROLLING SHIFTING PROCESSES IN A VEHICLE TRANSMISSION

BACKGROUND OF THE INVENTION

1. Field of the Invention

The invention concerns methods and apparatus for the control of the shifting processes of a vehicle transmission.

2. Description of Related Technology

Drive lines, especially drive lines with automatic transmissions which operate according to the principle of a torque converter with external power branching, in combination with connected mechanical working points, shifting programs with fixed switch points, or simple acceleration-dependent shifting programs are known. In the former, full load shifting normally occurs in the upper rpm range of the engine, n,. The shifting up, which is decisive for the fuel, occurs at about 80 to 90% of the nominal engine rpm. As a result, larger engine power is utilized to produce better acceleration of the vehicle, which may be necessary on a slope or when there are many passengers in the vehicle, especially in the case of buses. However, this also results in a higher fuel consumption because, at a higher rpm, the engine operates in a less favorable region of the characteristic (see e.g., FIG. 3 showing the engine characteristic of consumption as a function of load and rpm). In a braking operation, that is, in gear but with the gas on zero, the engine rpm has no influence on fuel consumption, since the fuel supply is stopped. In order to avoid vibration between gears, down shifting generally occurs at a lower rpm than up shifting, except for during kickdown. Furthermore, the shifting programs with fixed switch points are designed so that, for partial load or without load, certain shift points occur at lower engine rpm than at full load. In addition, a so-called overstep or kickdown function can be provided which opens up the possibility of running the gears to the maximum permissible engine rpm. Such shifting programs with fixed shift points operate either in a power-oriented manner characterized by increased fuel consumption, or they are operated very much oriented to consumption.

SUMMARY OF THE INVENTION

It is an object of the invention to overcome one or more of the problems described above. It also is an object of the invention to further develop a method for the operation of a drive unit and a device for carrying out the method in such a way that improved engine transmission management is obtained, with the goal to provide more comfort and better acceleration and deceleration behavior for reasons of safety under all driving conditions as well as to provide a reduction in fuel consumption from the point of view of environmental protection.

According to a method of the invention, shifting processes in a vehicle transmission from an initial gear to the next higher target gear are controlled by performing the steps of continuously determining the vehicle acceleration (a) and the driven rpm ($n_2$) behind the vehicle transmission and initiating a shifting process when the acceleration value (a) and the essentially simultaneously recorded driven rpm value ($n_2$) fall on a shifting point which lies on a shifting characteristic ($n_2(a)$) in an acceleration-driven rpm diagram, where the shifting characteristic ($n_2(a)$) has a stepped course with at least two break points (a_max; a_min) and the slope of the shifting characteristic for acceleration values a_min<a<a_max is always smaller than or equal to the slope of the shifting characteristic for acceleration values a≦a_min or a≧a_max. In other words, the following applies:

$|n_2(a_1)| \leqq |n_2(a_2)|$ where $a_1 \in [a\_min<a<a\_max]$ and $a_2 \in ]a\_max<a<\infty[$ or $a_2 \in [0<a<a\_min[$.

When connecting the vehicle transmission with different axle-drive ratios, the shifting characteristic ($n_2(a)$) with break points (a_max; a_min) is the same for all possible axle-drive ratios.

Also according to a method of the invention, the acceleration values at which the shifting processes are initiated are recorded in order to obtain a switch point frequency distribution.

Further according to the invention, a control device for a vehicle transmission, preferably an automatic transmission, includes apparatus for recording acceleration of the vehicle, apparatus for recording driven rpm of the vehicle, and a plurality of memory regions, wherein, in one of the memory regions, a shifting characteristic $n_2(a)$ is stored, which has a stepped course with at least two break points a_max and a_min and the slope of the characteristic for acceleration values a_min<a<a_max is always smaller than or equal to the slope of the shifting characteristic for acceleration values a≦a_min or a≧a_max. In other words, the following always applies:

$|n_2(a_1)| \leqq |n_2(a_2)|$ where $a_1 \in [a\_min<a<a\_max]$ and $a_2 \in ]a\_max<a<\infty[$ or $a_2 \in [0<a<a\_min[$ The control device further includes apparatus for triggering a shifting process when the recorded acceleration and the driven rpm lie on a switch point of the shifting characteristic and another memory region for storing the acceleration shifting values before the shifting process and/or the driving rpm values after the shifting process. Further, the control device includes apparatus for reaching the mean value of the stored acceleration shifting value and/or driving rpm values and for adapting the characteristic to the mean value of the stored acceleration shifting values and/or driving rpm value.

Other objects and advantages of the invention will be apparent to those skilled in the art from the following detailed description taken in conjunction with the drawing figures and the appended claims.

DETAILED DESCRIPTION OF THE INVENTION

Figure 1:
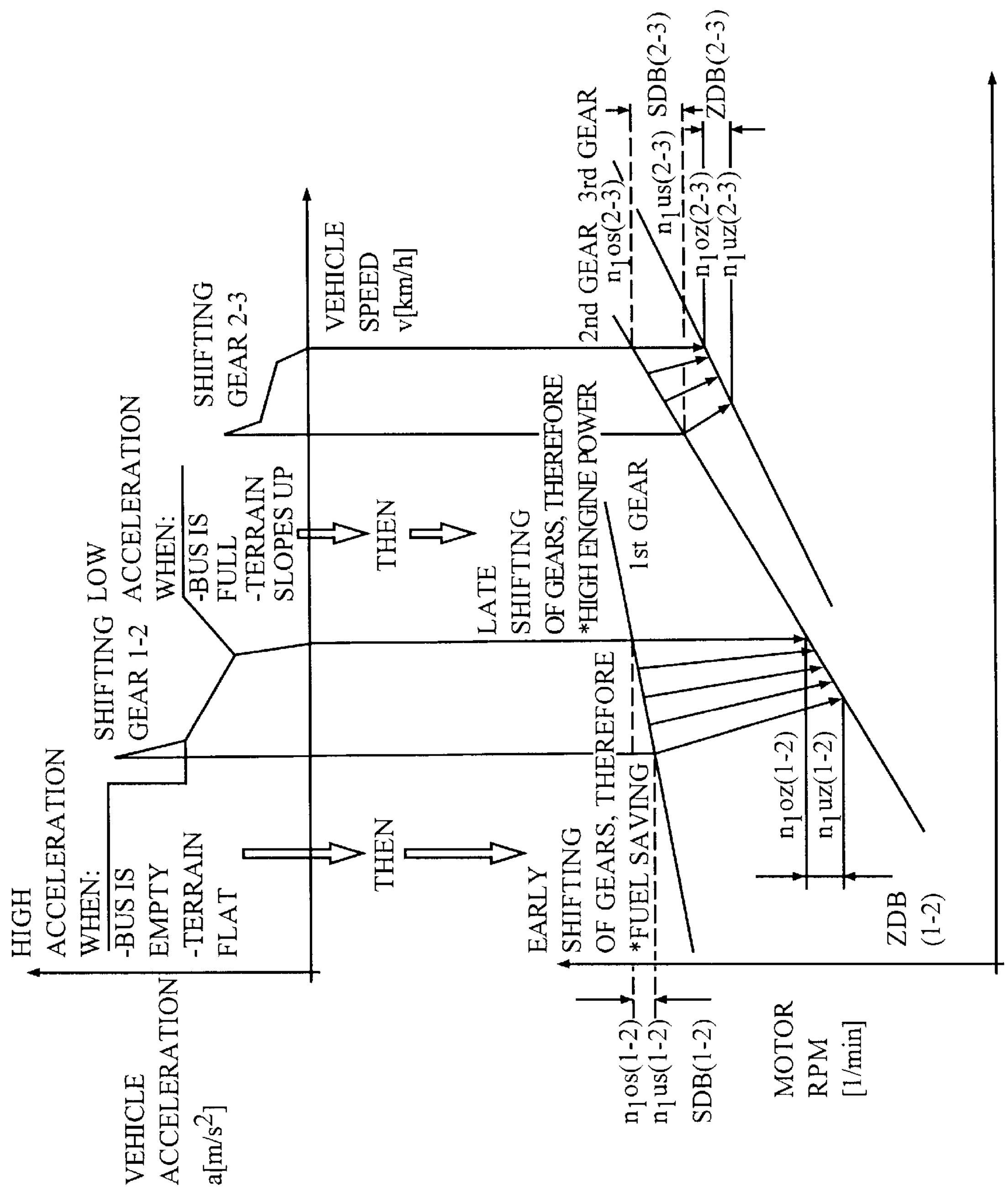
FIG. 1 is a two-part diagram schematically showing the basic principle of an acceleration-dependent shifting process with the aid of the driven rpm/acceleration diagram; at top is shown vehicle acceleration a vs. vehicle velocity v; and at bottom, motor input or driving velocity (rpm) $n_1$ vs. vehicle velocity v.

The following is an explanation of some of the terms used in this application:

"Achieved rpm" is the drive or engine rpm achieved in the next gear, that is, in the gear after shifting.

"Shifting rpm" is the present engine rpm in a gear from which the shifting occurs to the next highest or next lowest gear.

"Limiting rpms" are the lowest possible and the highest possible shifting rpm.

"Shifting rpm range" is the rpm range given by the limiting rpm of a gear from which the shifting is done.

The "target rpm" is the engine or driving rpm which is achieved when shifting with a number of shifting rpm values.

The "target rpm range" is the engine or driving rpm range limited by the target rpm in the target gear.

The index "conv. " characterizes shifting processes with fixed switch points.

According to the invention, shifting occurs as a function of acceleration. Thus, depending on the requirements or drive resistance, the shifting is done at lower or higher driving or engine rpm, depending on whether low fuel consumption or sufficient acceleration is to be preferred. The shifting itself is determined by the acceleration or deceleration of the vehicle. Two following limiting driving states or accelerations are taken into consideration:

1. With a low load of the vehicle, on a flat or sloping-down terrain=high vehicle acceleration; and
2. High load in the vehicle and sloping-up terrain=low vehicle acceleration.

In the former case (1. low load; flat or down-sloping terrain), high vehicle acceleration is obtained at low driving rpm. Therefore, shifting of the gears can occur early at a relatively low engine rpm, which leads to a reduction in fuel consumption. For the same reason, down-shifting the gears occurs at lower deceleration with lower engine rpm.

In the second case, higher engine power is necessary and, therefore, up-shifting is performed at relatively high engine rpm. Depending on the measured vehicle acceleration or deceleration, shifting the gears up or down occurs smoothly between these two driving states, that is, in a shifting rpm range. The shifting rpm range itself is dependent on the degree of load; consequently, shifting occurs at a higher rpm when the load is higher.

The acceleration/driven rpm characteristic has a stepped appearance in the acceleration/driven rpm diagram.

Here, the two limiting states—low vehicle load on a flat or downgrade terrain and high vehicle load with an upward sloping terrain—are taken into consideration, that is, high acceleration and low acceleration.

At high acceleration, the shifting process is started at lower shifting rpm values, that is, earlier than in a conventional shifting program with a fixed shift point, provided that the same target rpm values are to be reached in the target gear. Otherwise, that is, when the shifting process is started at the same shifting rpm, there is a shift of the achieved target rpm to higher driving or engine rpm values. At low acceleration and high required load, the shifting into the next higher gear occurs at higher driving or engine rpm values, but these are smaller than in a conventional shifting process in view of the achieved target rpm. The target rpm values obtained preferably correspond to the conventional rpm values attained in a conventional shifting process, where acceleration is not taken into consideration.

The two target rpm values determine a so-called target rpm range. The shifting process occurs between these two states gradually, depending on the acceleration. Thus, the step characteristic is obtained in the acceleration/driven rpm diagram. The target rpm and the corresponding shifting rpm can be determined ahead of time, freely, with consideration of the critical engine rpm in the target gear and the originating gear, depending on whether the shifting occurs into the next higher or next lower gear. However, the target rpm values can also be the same as those determined in a conventional shifting process with fixed switch points.

However, a step characteristic can only be realized with a lower target rpm and another upper achievable rpm in the target gear. The upper achievable rpm in the target gear is only reached when shifting at one shifting rpm, while the lower target rpm is achieved in shifting processes in which a number of different shifting rpm values are introduced.

The total theoretically available shifting rpm range for shifting processes into the next higher or into the next lower gear is determined by the lowest critical engine rpm and the maximum engine rpm, called limiting rpm values. At high positive acceleration, with consideration of the lowermost critical engine rpm, especially of the driving or engine rpm in the target gear when up-shifting and, respectively, at high negative acceleration, with consideration of the driving and engine rpm in the initial gear when down-shifting, shifting occurs earlier. The driving characteristics can be adapted better with consideration of weight, axle-drive ratio and engine momentum. At low acceleration, shifting occurs at high rpm values.

In conventional drive programs with fixed switch points, up-shifting and down-shifting between gears occurs at fixed predetermined shifting rpm values. In the driven rpm/ driving rpm diagram, this means different target rpm values depending on the resistance to travel, that is, depending on the acceleration during the shifting process. In the extreme case, one obtains a target rpm with constant driven rpm divided by the gear change, otherwise, higher target rpm values are obtained. In the acceleration-dependent shifting process, the possible shifting rpm range is increased so that, as a function of the acceleration of the vehicle, at high acceleration, the shifting can occur at a lower shifting range during up-shifting, in comparison to the conventional shifting process, even though there is a previously determined target rpm after the shifting process. In other words, when up-shifting at high vehicle acceleration, the shifting occurs at lower engine rpm values than in a conventional shifting program with fixed switch points; however, the shifting processes can be designed and introduced with regard to shifting rpm and acceleration in such a way that, in case the shifting occurs at engine rpm values which are smaller than the smallest possible one in conventional shifting, always the same rpm are achieved in the target gear without any influence of the acceleration.

Depending on the acceleration of the vehicle and on the load, the shifting range is established in such a way that at least one target rpm is achieved. This can lie in the region of the lowest critical rpm in the target, but it cannot be less than that. When considering both limiting states, the shifting range is established in such a way that always an rpm between the two target rpm values is reached.

According an embodiment of the invention, the shifting characteristic of the acceleration-dependent shifting program described in detail above is set up for different axle-drive ratios in such a way that the fuel consumption is optimized with the same shifting program.

For this purpose, according to the invention, it is provided that the acceleration/driven rpm characteristic $n_{2(a)}$, which is the basis of the shifting program, is adjusted to the frequency of shifting of the back axle transmission with the lowest axle-drive ratio. The vehicle with the lowest axle-drive ratio is then optimized for the intended application, because, in the range of high acceleration, shifting occurs at lower engine rpm values and in the region of low acceleration it occurs at higher rpm values. In the case of vehicles with a high axle-drive ratio, the shifting points lie essentially at higher accelerations than in a vehicle with a lower axle-drive ratio. Thus, the vehicle has a tendency to shift at lower engine rpm, which is again advantageous from the point of view of fuel consumption. According to such an embodiment of the invention, thus the same shifting characteristic can be used for different back axle-drive ratios.

According to another embodiment of the invention, the shifting characteristic on which the acceleration-dependent shifting program is based, is adapted to the particular area of application of the vehicle.

For this purpose, the switch or shift points are read into a memory and there a mean value is formed through a certain number of shift points, and the mean value determines the position of the characteristic. In this way, it is possible to achieve fuel optimization in spite of different use conditions, thus avoiding going below a certain minimum driving rpm that would lead to diminishing of comfort.

In addition to the position of the shifting characteristic, another embodiment of the invention may include a provision for varying the slope of this characteristic as a function of the area of application, so that going below the target rpm, which is undesirable, can be avoided in all cases.

In addition to the methods of the invention, the invention also provides a control device 10, especially for carrying out such methods.

The control device 10 includes means for recording the vehicle acceleration and the driven rpm, for example, sensors 12 and 14. Preferably, the control device is a microcomputer unit, for example, with a memory element 18. The break points a_min and a_max as well as characteristic points, for example, where the stepped characteristic for the acceleration-dependent shifting $n_2(a)$ goes through the zero, are entered into the first memory region 18*a*. Furthermore, the control device 10 includes a microprocessor 16 which, using the actually measured vehicle acceleration and the parameter values entered, calculates a shifting rpm on the step characteristic and then this is compared with the actually measured rpm. A up-shifting process is initiated when the actually measured rpm is greater or equal to the calculated rpm.

Using the acceleration values accumulated through several shifting processes in another memory region 18*b*, with the aid of the microprocessor 16, a mean value $\overline{S}$ is formed from the acceleration values at which a shifting process was triggered. For example, such an averaging can be performed after ten (10) shifting processes.

With the aid of the microprocessor 16, it is possible to read from the first memory region 18*a* characteristic values for the shifting characteristic, such as, for example, for the break points a_max and a_min, which will be defined subsequently herein, and using an algorithm to determine if the mean value $\overline{S}$ is, for example, within a_max and a_min.

If this is not the case, then, using the microprocessor 16, and a certain method of calculation, for example, so that $\overline{S}$ should always be in the middle of a region defined by a_max and a_min, thus, $$(a\_\max)_{neu} = \frac{a\_\max_{alt} - a\_\min_{alt}}{2} + \overline{S}$$

and $$(a\_\min)_{neu} = \overline{S} - \frac{a\_\max_{alt} - a\_\min_{alt}}{2}$$

a new characteristic is calculated and read into the first memory region 18*a*. Similarly to the adaptation of a_max and a_min to the mean value of acceleration $\overline{S}$, the slope of the characteristic can be adjusted for a>a_max. For this purpose, the control device has a third memory region 18*c* in which the driving rpm values are read and stored after the shifting process.

Generally, FIG. 1 schematically shows the basic principle of an acceleration-dependent shifting program. For explanation, in two diagrams, the vehicle acceleration a is plotted as a function of the vehicle velocity v, which is proportional to the driven rpm $n_2$, and the engine rpm or driving rpm $n_1$ is plotted as a function of vehicle velocity v, for the individual shifting processes from first to second gear as well as from second to third gear. It can be seen from this that two limiting travel conditions or accelerations are taken into consideration:

1. Travel at low load in the vehicle on a plane or downward sloping terrain gives sufficient vehicle acceleration, even at low engine rpm values $n_1$. In this case, shifting up always occurs early at relatively low engine rpm $n_1$, which generally leads to a reduction of fuel consumption.
2. At high load in the vehicle or on an upward sloping terrain, larger engine power is necessary. Therefore, shifting up occurs at a relatively high engine rpm.

Depending on the measured bus acceleration or deceleration, up- or down-shifting of the gears occurs between these two travel conditions smoothly, that is, in a so-called shifting rpm range, which is designated with SDB in FIG. 1. The notation $SDB_{(1-2)}$ stands for the shifting rpm range for shifting from first to second gear and the notation $SDB_{(2-3)}$ refers to the shifting rpm range with reference to the driving rpm or engine rpm, when shifting from second to third gear.

Furthermore, the shifting rpm range SDB depends on the corresponding load stage; at higher load, shifting generally occurs at a higher shifting rpm, so that a higher engine or driving rpm occurs in the next gear. The shifting rpm ranges $SDB_{(1-2)}$ and $SDB_{(2-3)}$ are delineated by a lower shifting rpm $n_{1US(1-2)}$ and $n_{1US(2-3)}$, respectively, when shifting from first to second and second to third gear, respectively, and by an upper shifting rpm $n_{1OS(1-2)}$ and $n_{1OS(2-3)}$, respectively, when shifting from first to second gear, or second to third gear, respectively. The lowermost shifting rpm $n_{1US(1-2)}$ and $n_{1US(2-3)}$ is determined from the lowermost critical drive or engine rpm $n_1$ in the target gear. In this way, it is ensured that the rpm is not lower than this critical engine rpm, because otherwise vehicle noise and bucking of the vehicle will occur as a result of torque oscillation.

A target rpm range $ZDB_{(1-2)}$ or $ZDB_{(2-3)}$ in the target gear is assigned to each shifting rpm range $SDB_{(1-2)}$ and $SDB_{(2-3)}$, respectively. The target rpm ranges are delineated by a smaller target rpm $n_{1UZ(1-2)}$ and $n_{1UZ(2-3)}$ and by an upper target rpm $n_{1OZ(1-2)}$ and $n_{1OZ(2-3)}$, respectively. The lowest target rpm values in the individual gears are limited by the lowest critical driving or engine rpm when up-shifting. When down-shifting, the critical engine rpm is the criterion for establishing the lowest shifting rpm in the initial gear.

Furthermore, it is possible to further vary this normal acceleration-dependent down-shifting shown in FIG. 1. This can be done by a) consumption-oriented and/or b) power-oriented acceleration-dependent shifting processes.

Figure 2A:
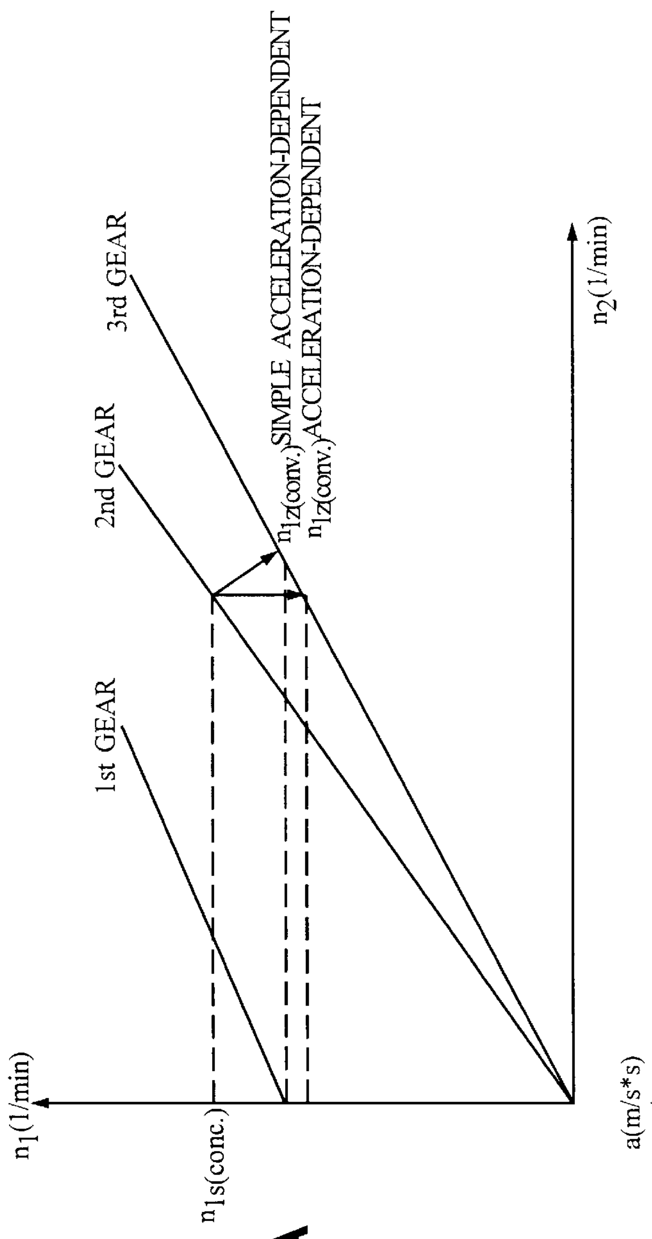
FIG. 2*a* is a diagram showing motor input or driving velocity $n_1$ vs. output velocity (i.e., driven rpm) $n_2$ providing an explanation of a conventional shifting process.
Figure 2B:
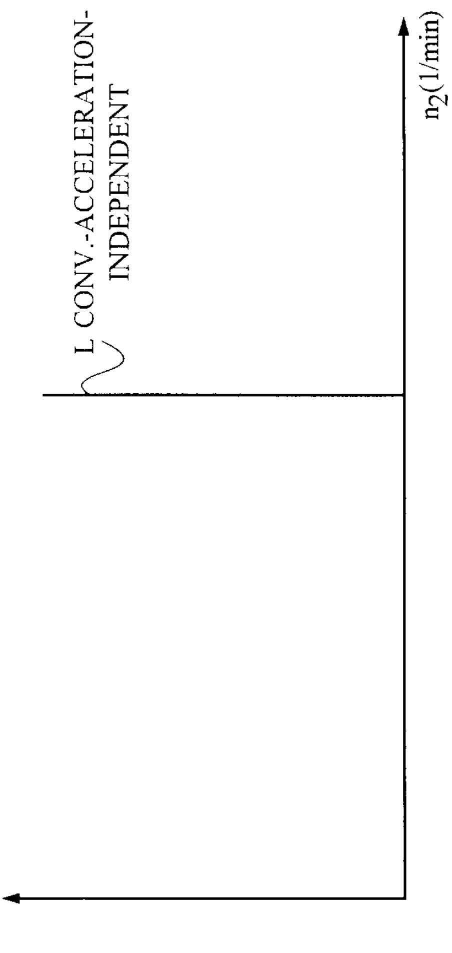
FIG. 2*b* is a diagram showing vehicle acceleration a vs. driven velocity $n_2$ also providing an explanation of a conventional shifting process shown in FIG. 2*a*.

FIGS. 2*a* and 2*b* show, in two diagrams, the characteristic for a conventional shifting process with fixed shifting points for a shifting process for the extreme case without influence of acceleration. In the diagrams, vehicle acceleration a is plotted as a function of vehicle velocity v, which is proportional to the driven rpm $n_2$, and the engine rpm or driving rpm $n_1$ is plotted as a function of the vehicle velocity v for a shifting process. In conventional shifting, this occurs, for example, at a shifting rpm $n_{1Z(conv.)}$. In an extreme case, without influence of acceleration, in third gear a driving rpm or engine rpm is reached as target rpm $n_{1Z(conv.)\text{-}acceleration\text{-}independent}$. In the acceleration/driven rpm diagram, we have the characteristic $L_{conv.\text{-}acceleration\text{-}independent}$ for this shifting process. However, since, for example, in an empty vehicle and going downhill, during the shifting process, because of the physical conditions, an acceleration can occur, when the shifting process is started at $n_{1a(conv.)}$, not $n_{1Z(conv.)\text{-}acceleration\text{-}independent}$ will be established in the target gear, but a higher driving rpm and thus also a high driven rpm. In this example, it is $n_{1Z(conv.)\text{-}simple\ acceleration\text{-}dependent}$.

In the subsequent drawing figures, the acceleration-dependent shifting according to the invention, on which the invention is based, is explained with the various possible variations using an example.

Figure 3:
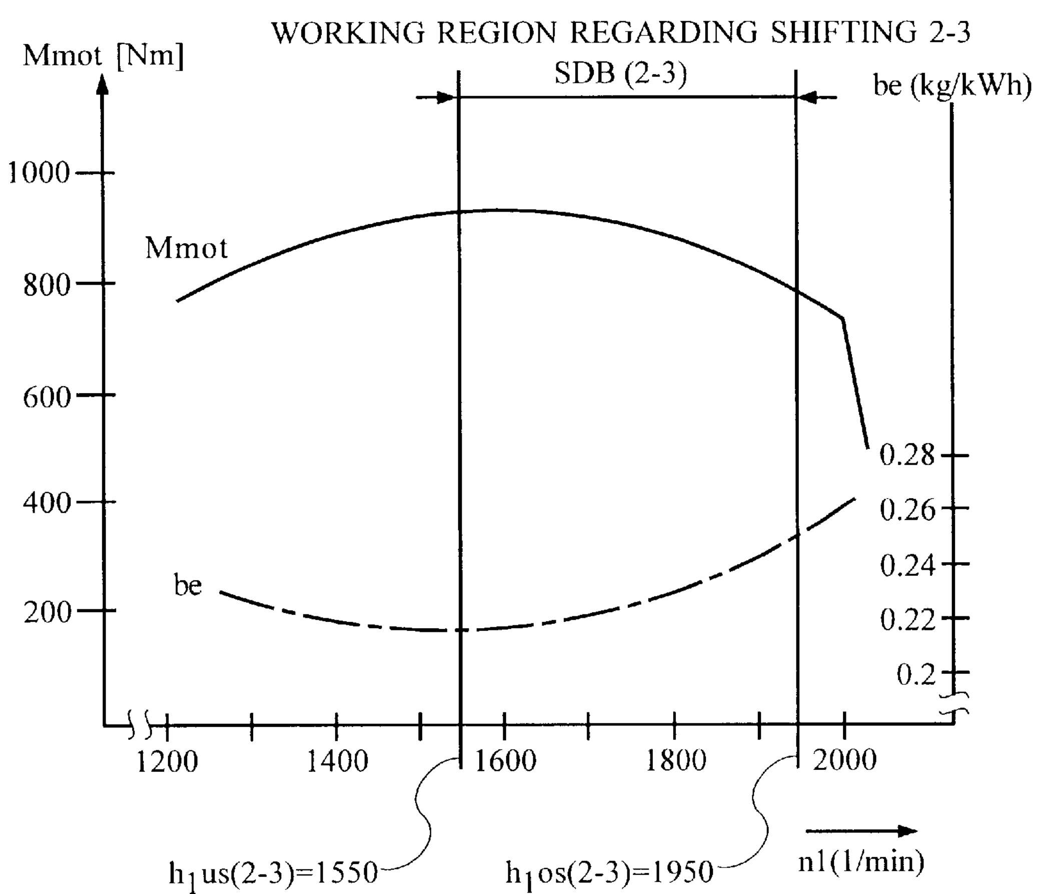
FIG. 3 is a diagram showing an engine torque curve $M_{mot}$ vs. output speed $n_2$ also showing fuel consumption be vs. output speed $n_2$ according to the invention with the driving rpm in a gear, with the aid of a section of motor characteristic field.

FIG. 3 shows an engine torque curve $M_{engine}$ (identified on FIG. 3 as $M_{mot}$) as a function of the driving rpm of the engine, $n_1$, and the corresponding fuel consumption "be" vs. driving rpm for the working or shifting rpm region in second gear with regard to shifting from second to third gear. This working or shifting region is denoted here as shifting rpm range $SDB_{(2-3)}$. The lowest rpm, $n_1$, at which shifting can occur from second gear to third gear is denoted here as $n_{1US(2-3)}$. The largest rpm at which shifting from second gear to third can occur is noted here with $n_{1OS(2-3)}$. These two rpm values limit the shifting rpm region $SDB_{(2-3)}$. It can be seen from this diagram that, in second gear, at low rpm, the fuel consumption is low while the engine torque is high. Conversely, at the highest possible shifting rpm in second gear, $n_{1OS(2-3)}$, one finds the highest fuel consumption at low engine torque.

Figure 4A:
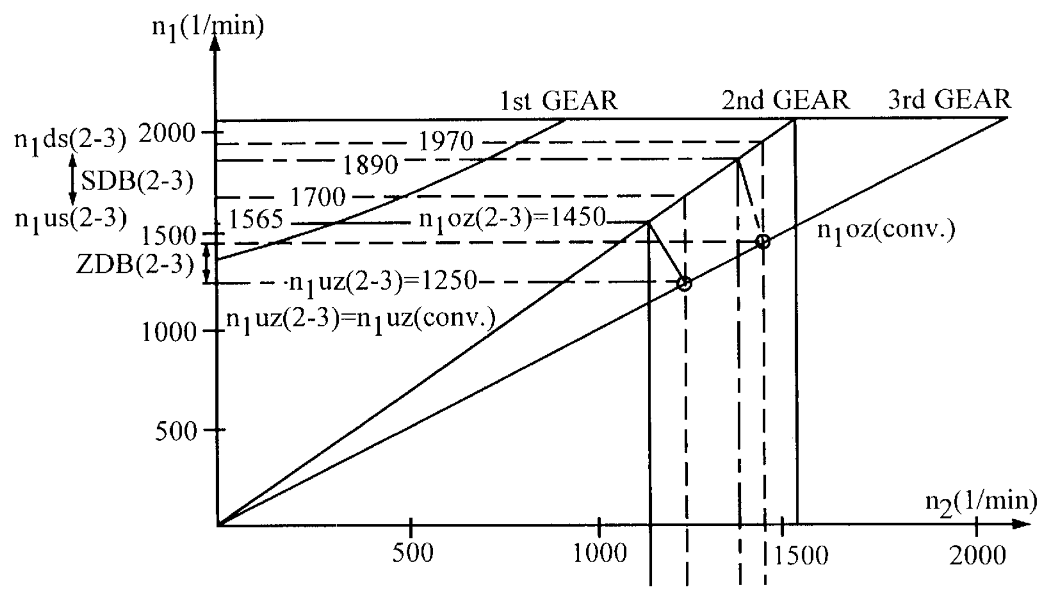
FIG. 4*a* is a diagram showing motor speed $n_1$ vs. output speed $n_2$ illustrating an example according to the invention of a method of gear shifting using an acceleration-dependent shifting program.
Figure 4B:
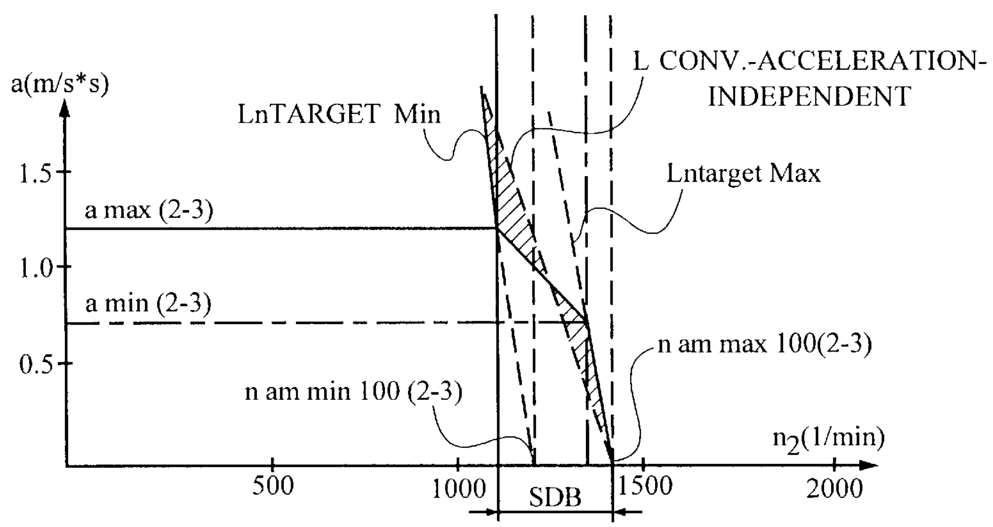
FIG. 4*b* is a diagram showing vehicle acceleration a vs. output speed $n_2$ also illustrating the example of the invention shown in FIG. 4*a* of a method of gear shifting using an acceleration-dependent shifting program.

FIGS. 4*a* and 4*b* show with the aid of two diagrams, in which the driving rpm $n_1$ is plotted as a function of the driven rpm $n_2$ and the acceleration a is plotted as a function of the driven rpm $n_2$, an example for a normal acceleration-dependent version of an acceleration-dependent shifting process for shifting from second gear to third gear. The numerical values in the diagram merely serve for explanation.

In conventional shifting, the smallest possible shifting rpm $n_{1US(conv.)}$ in second gear is, for example, 1700 $min^{-1}$, with which, a driving rpm or engine rpm is achieved in third gear as target rpm $n_{1UZ(conv.)}$, with a value of 1250 $min^{-1}$ without influence of acceleration. However, based on consideration of a possible acceleration component, the introduction of the shifting process can occur significantly earlier, that is, at lower shifting rpm values of $n_{1a(2-3)}$, here, for example, at the lowest shifting rpm $n_{1US(2-3)}$ of 1565 $min^{-1}$. In spite of this, the driving or engine rpm $n_{1UZ(2-3)}=n_{1UZ(conv.)}$ of 1250 $min^{-1}$ is reached in this example. This driving or engine rpm in third gear of 1250 $min^{-1}$ is achieved when shifting values in the shifting rpm partial range from $n_{1US(2-3)}$ to $n_{1US(conv.)}$. The rpm $n_{tUZ(2-3)}$ is therefore also called target rpm $n_{target\ min}$. By analogy, these conclusions can also be transferred to the upper, that is, to the highest possible shifting rpm. The highest possible shifting rpm in second gear is $n_{1OS(conv.)}=1970\ min^{-1}$ in a conventional shifting process. After completion of the shifting, in third gear, the driving or engine rpm $n_{1OZ(conv.)}=1450\ min^{-1}$. However, in case of acceleration-dependent shifting, when a shifting component occurs, the shifting process can be introduced earlier, as a function of the magnitude of acceleration, for example, at an engine rpm $n_{1S(2-3)}=1890\ min^{-1}$. In spite of this, in third gear, again the same driving or engine rpm values $n_{1Z}=n_{1OZ(conv.)}=n_{target\ max}=1450\ min^{-1}$ is achieved. At an acceleration of $a=0 m\cdot s^{-2}$, the shifting occurs from second to third gear at $n_{1S(2-3)}=n_{1OS(conv.)}$ and therefore this shifting rpm is designated with $n_{1OS(2-3)}$ for acceleration-dependent shifting from second to third gear.

The shifting rpm range for shifting from second to third gear $SDB_{(2-3)}$ is limited, for example, by the rpm values $n_{1US(2-3)}$ and $n_{1OS(2-3)}$. According to the invention, the determination of the shifting rpm values in this shifting rpm range is done in such a way that, after the completion of the shifting process, that is, in third gear, a driving rpm $n_{1Z}$ is achieved in the target rpm range $ZDB_{(2-3)}$ of $n_{1UZ(2-3)}$ to $n_{1OZ(2-3)}$ and the rpm value will not be lower than the lowest critical driving or engine rpm in the target gear when shifting up.

As a result of early shifting at high acceleration, a lower engine or driving rpm is achieved. It is decisive that, at each acceleration, the shifting process is initiated as a function of the two limiting states to be taken into consideration, at driving or engine rpm, that is, shifting rpm $n_{1a}$ in the initial gear, at which always the rpm—the target rpm $n_{1Z}$—will be in the target rpm region in the next gear. Thus, when shifting from second gear to third gear, an acceleration component is utilized, which, in comparison to the conventional shifting process with fixed, predetermined switch points, has a higher engine or driving rpm in the next gear, here, in the third gear. With consideration of the acceleration component, the shifting rpm range $SDB_{(2-3)}$ during a shifting process from second to third gear, can be shifted to lower driving or engine rpm values in comparison to the conventional shifting process.

The target rpm $n_{tUZ(2-3)}$ and $n_{1OZ(2-3)}$, which can be theoretically the minimum and maximum target rpm $n_{target\ min}$ and $n_{target\ max}$, respectively, determine the target rpm range $ZDB_{(2-3)}$. The minimum and maximum target rpm values $n_{target\ min}$ and $n_{target\ max}$ determine the theoretically possible target rpm range $ZDB_{(2-3)theoret.}$. As a rule, the size of this is determined according to the target rpm values achieved in the target gear with a shifting process without taking acceleration into consideration. In the present case, this means that, when shifting from second gear to third gear, at an engine or driving rpm of $n_{1US(2-3)}=1565\ min^{-1}$ and at a higher driving rpm of $n_{1S(2-3)}<n_{1S(conv.)}$—for example $n_{1S(2-3)}=1600\ min^{-1}$—an rpm of $n_{UZ(2-3)}=n_{target\ min}$ is achieved in third gear.

In the case of an empty vehicle and maximum acceleration, the shifting in second gear occurs with the lower limiting rpm $n_{1US(2-3)}$, while, for example, with 100% load and minimum acceleration, the shifting occurs at very high rpm values in the shifting rpm range $SDB_{(2-3)}$, but at a shifting rpm $n_{1a(2-3)}<n_{1OS(conv.)}=n_{1OS(2-3)}$.

FIG. 4$b$ shows the resulting acceleration/driven rpm characteristics $n_2(a)$ for the target rpm values of the two limiting states 1) empty vehicle and high acceleration, and 2) vehicle with, for example, 100% load and low acceleration shown in the acceleration/driven rpm diagram as dotted lines $n_{target\ min}$ and $n_{target\ max}$.

The relationship between the two characteristics at points of maximum and minimum acceleration in the plane $a_{max(2-3)}$ and $a_{min(2-3)}$ reflects the influence of the acceleration and leads to a stepped characteristic $n_2(a)$ with break points at $a_{max(2-3)}$ and $a_{min(2-3)}$ for the acceleration when shifting from second to third gear. The break points $a_{max(2-3)}$ and $a_{min(2-3)}$ can be established as follows:

$a_{max(2-3)}$ is the maximum acceleration which is reached by the vehicle in case of a predetermined driving unit on a largely flat terrain and largely empty vehicle before the shifting process; and $a_{min(2-3)}$ is the maximum acceleration which is reached by the vehicle in case of a predetermined driving unit on a largely flat terrain and by largely full vehicle before the shifting process.

The vehicle accelerations $a>a_{max(2-3)}$ can occur with an empty vehicle going downhill and values $a<a_{min(2-3)}$ with a 100% load on the vehicle and on a rising terrain.

For a maximum acceleration $a_{max(2-3)}$ with empty vehicle, a shifting rpm of $n_{1US(2-3)}$ is established. A minimum acceleration $a_{min(2-3)}$ with load, here for example, 100%, corresponds to a shifting rpm in the region of $n_{1OS}$.

The characteristic shown in FIG. 4$b$ of $n_2(a)$, with the break points $a_{max(2-3)}$ and $a_{min(2-3)}$ only applies to a loaded state. However, corresponding to the position of the power output stage of the driving machine, for example, to the throttle valve position, different load states are obtained which must also be taken into consideration during shifting or in the design of the shifting rpm range.

There is a possibility of being able to establish the target rpm range, i.e., the achieved rpm values, also known as the driving and engine rpm values $n_{1Z}$ in the next gear after the shifting process in the theoretically possible range between $n_{1target\ min}$ and $n_{1target\ max}$ as a function of the engine momentum 1) continuously, or 2) with assigned load steps.

Then, in the second case, depending on the number of load stages, an equal number of predeterminable target rpm ranges can be distinguished as well as the corresponding shifting rpm ranges, which can differ in magnitude from one another.

The dash-dot line in FIG. 4$b$ gives the known characteristic $L_{conv\text{-}simple\ acceleration\text{-}dependent}$ for a conventional simple acceleration-independent [sic] shifting. In case of an empty vehicle and maximum acceleration, the shifting process in second gear occurs at a shifting rpm of $n_{1US(conv.)}$, while at minimum acceleration and, for example, 100% loading, it still occurs at a shifting rpm $n_{tOS(conv.)}$. The shading shows the deviation of the two characteristics. It can be seen from this that, according to the invention, at high acceleration, in contrast to the known conventional characteristic, $L_{conv.\text{-}simple\ acceleration\text{-}dependent}$ the shifting process occurs at lower rpm values, while in the case of minimum acceleration and high load of the vehicle, the shifting process occurs at higher rpm values.

Figure 5A:
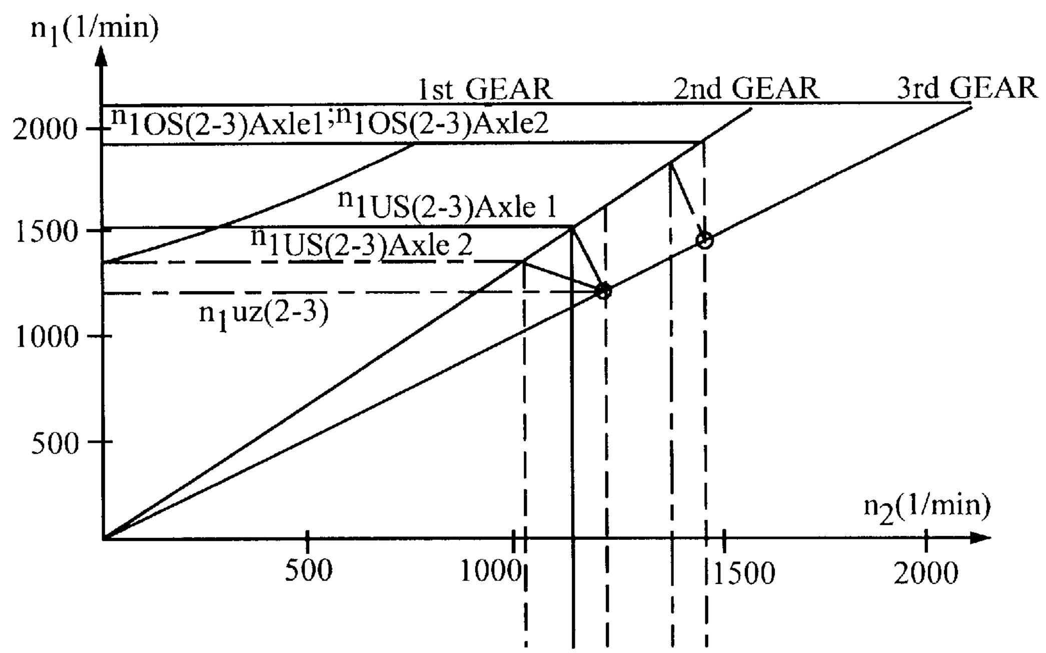
FIG. 5*a* is a diagram showing motor speed $n_1$ vs. output speed $n_2$ illustrating an example according to the invention showing characteristics of the driving/driven rpm as well as the shifting frequency distributions for different back axle-drive ratios.

In FIGS. 5$a$ and 5$b$, again the driving rpm $n_1$ is plotted as a function of the driven rpm $n_2$ as well as the acceleration a of the vehicle being plotted as a function of the driven rpm $n_2$. The shifting process will again be explained using shifting from second to third gear as an example. Therefore, the notation of the break point in the indexing (2-3) will be omitted below and the break points will generally be noted as a_max and a_min.

If, behind (i.e. downstream) the transmission driven line the driven rpm $n_2$ of which is decisive for the shifting program, it is connected with different back axle-drive ratios, in order to thus influence the end velocity of the vehicle, naturally, both the travel behavior as well as the acceleration behavior will change as a function of the selected back axle-drive ratio. It is generally true that, at high axle-drive ratios and at low end velocities, higher acceleration values are achieved at the same driven rpm $n_2$ than at low axle-drive ratios and high end velocities. Based on the higher acceleration achieved at the same driven rpm, with vehicles with high axle-drive ratios, it will be possible to switch at driving rpm values which are lower than those for vehicles with low ratio, in order to arrive at the same target rpm. According to FIG. 5$a$, for example, the lower shifting limit for a vehicle with high axle-drive ratio $n_{US(2-3)axle\ 2}$ can be reduced in comparison to the lower shifting limit for a vehicle with low axle-drive ratio $n_{1US(2-3)axle\ 1}$ from approximately 1500 rpm to about 1380 rpm. According to the rules set up above, for a vehicle with such an axle-drive ratio, the characteristic 22 with break points $a\_max_{AXLE\ 1}$ and $a\_min_{AXLE\ 2}$ drawn in FIG. 5$b$ would be obtained.

For an axle transmission with low ratio, as already mentioned before, the acceleration values achieved by the vehicle are lower, which leads to an increase of the lower shifting limit $n_{1US(2-3)axle\ 1}$ and to a characteristic 11 with break points $a\_max_{AXLE\ 1}$ and $a\_min_{AXLE\ 1}$, which were formed, for example, as defined above.

As can be seen from this, thus it would be necessary to provide an individual shifting characteristic $n_2(a)$ for the acceleration-dependent shifting program for each vehicle as a function of the axle-drive ratio.

On the other hand, the method according to the invention makes it possible to achieve optimum results with the same shifting program for greatly differing axle-drive ratios, which leads to a significant savings in cost.

It is provided according to the invention that, in the shifting characteristic n2(a), which is applicable for all axle-drive ratios, the break points a_max and a_min are set for the smallest axle-drive ratio of the vehicle, and then the shifting characteristic 11 can be used for all possible axle-drive ratios.

Figure 5B:
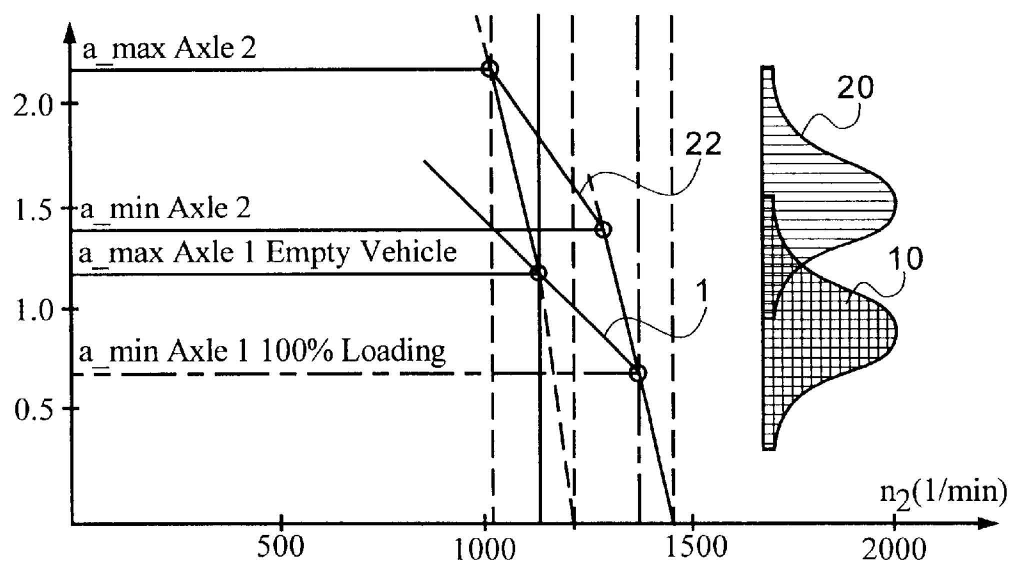
FIG. 5*b* is a diagram showing vehicle acceleration a vs. output speed $n_2$ also illustrating the example shown in FIG. 5*a* showing characteristics of acceleration and driven rpm as well as the shifting frequency distributions for different back axle-drive ratios.

As can be seen in FIG. 5*b*, at the lowest axle-drive ratio, as shown in curve 10, which shows the distribution of the accelerations reached at the beginning of the shifting, the majority of the switch points lie predominantly in the acceleration regions defined by $a_{max\ axis\ 2}$ for the empty vehicle and $a_{min\ axis\ 2}$ for 100% load.

For an axle transmission with higher transmission ratio, the switch points according to the curve 20 lie outside this range. This means that, for a higher ratio, the majority of the shifting processes will have a tendency to occur at a lower rpm than in the case of the optimum characteristic 22. However, because of the higher acceleration, this does not represent a problem; on the contrary, due to the fact that the shifting has a tendency to occur at a lower engine rpm, such a shifting behavior is advantageous from the point of view of fuel consumption. By the design of the characteristic according to the invention, for the axle transmission with the lowest ratio, it is achieved that, independently of the transmission switched following the driven line, optimum fuel behavior can be achieved with the same shifting program for other possible axle transmissions.

However, the fuel behavior of a vehicle is also influenced quite significantly by the surroundings into which the vehicle is placed and by the vehicle parameters. Thus, a shifting program which is initiated at a certain driven rpm and at a certain acceleration value will occur too early in a hilly terrain if the characteristic is designed incorrectly, as a result of which the desired target driven rpm is no longer reached.

Deviation from the vehicle parameters on which the design of the shifting characteristic was based also leads to a non-optimal shifting behavior.

Higher frictional resistance or lower engine power lead to lower acceleration values which again lead to higher shifting rpm values and thus to higher fuel consumption.

Such problems occur especially for vehicles with small axle-drive ratio.

Therefore, according to an embodiment of the invention, there is a method provided to include the distribution of shifting points and to enter them into a shifting point memory of the control equipment.

Figure 6A:
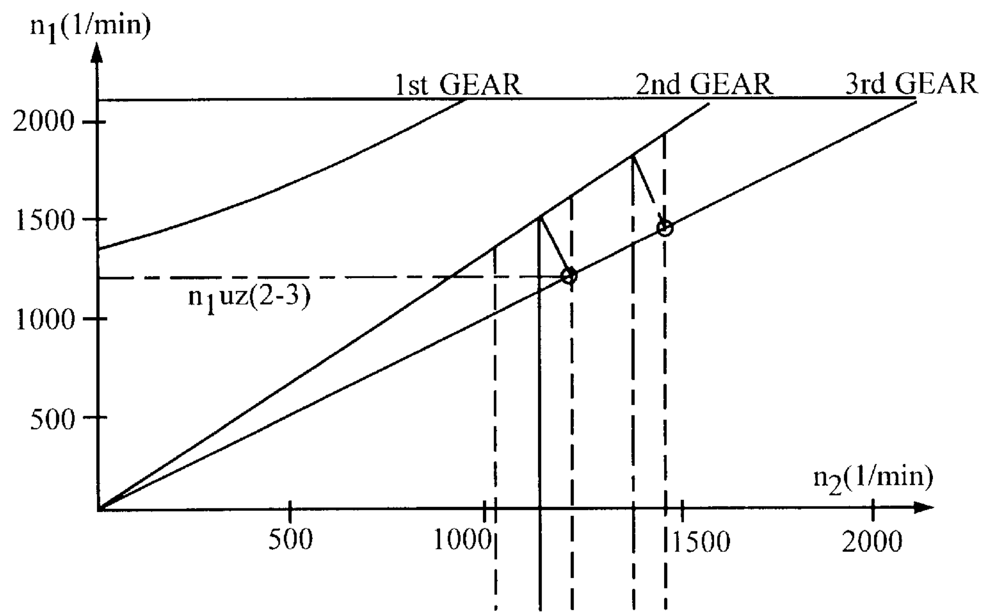
FIG. 6*a* is a diagram showing motor speed $n_1$ vs. output speed $n_2$ illustrating an example according to a method of the invention also showing shifting frequency distributions for different travel situations, both in hilly and flat terrain.
Figure 6B:
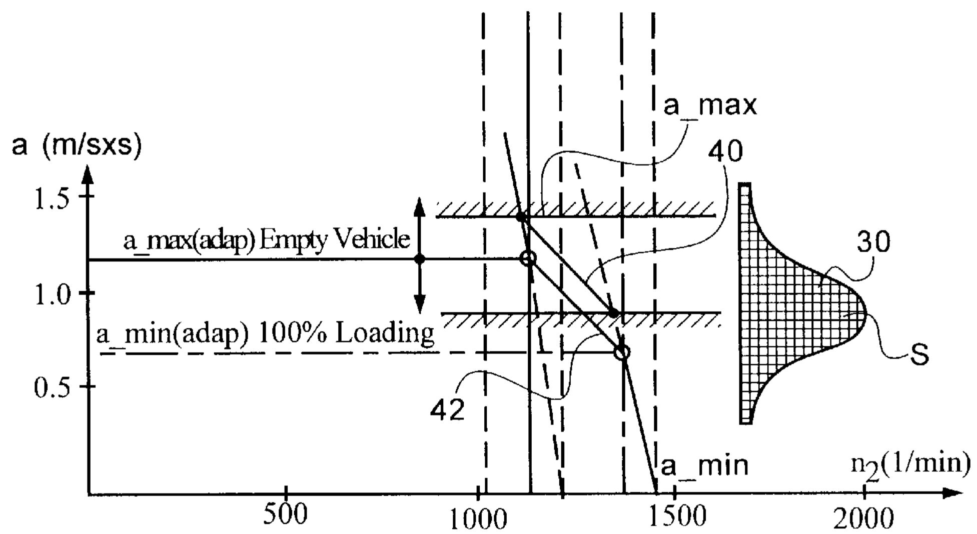
FIG. 6*b* is a diagram showing vehicle acceleration a vs. output speed $n_2$ also illustrating the example shown in FIG. 6*a* showing shifting frequency distributions for different travel situations, both in hilly and flat terrain.

As shown in FIG. 6*b* , for example, the distribution curve 30, the center of gravity of which was designated with S is obtained for a given operation. If the characteristic is not adapted, then the shifting will have a tendency to occur at a high driving rpm, which will lead to higher fuel consumption. An example of a characteristic which is not adapted to the distribution curve of the shifting points is the characteristic 40, shown in FIG. 6*b*, with shifting points a_max and a_min.

Therefore, methods according to the invention propose to adapt the shifting characteristic corresponding to the determined shifting distribution 30, in such a way that the switch points a_max and a_min correlate with the center of gravity S of the distribution curve. The characteristic 42 thus obtained, with the adapted switch points a_max(adap) and a_min(adap) thus represent the optimum for the section in which it is used and for the corresponding vehicle with regard to fuel consumption and travel comfort.

Forming the mean value in order to find the shifting mean value S can be done after recording of only 10 shifting processes and good results are obtained in this way. It is also possible to obtain a mean value of more than 10 or less than 10 shifting processes, the number of these depending on whether or not one is dealing with frequently occurring situations.

As already mentioned, complying with the target rpm, which is the final engine rpm after shifting, is of great importance. When the rpm is lower than the target rpm, which, in the present example, without this representing a limitation, can be the lower target rpm when shifting from 2nd to 3rd gear $n_{1US(2-3)}$, and which can also be the lowest critical rpm $n_{target\ min}$, leads to engine noise, while, when going over the maximum, this has higher fuel consumption as consequence. Due to scattering and changes in the properties that are specific to the vehicle and the engine, it is not possible to ensure when introducing the transmission that the actual rpm will not be below the target rpm, $n_{1UZ(2-3)}$, in all cases.

Figure 7A:
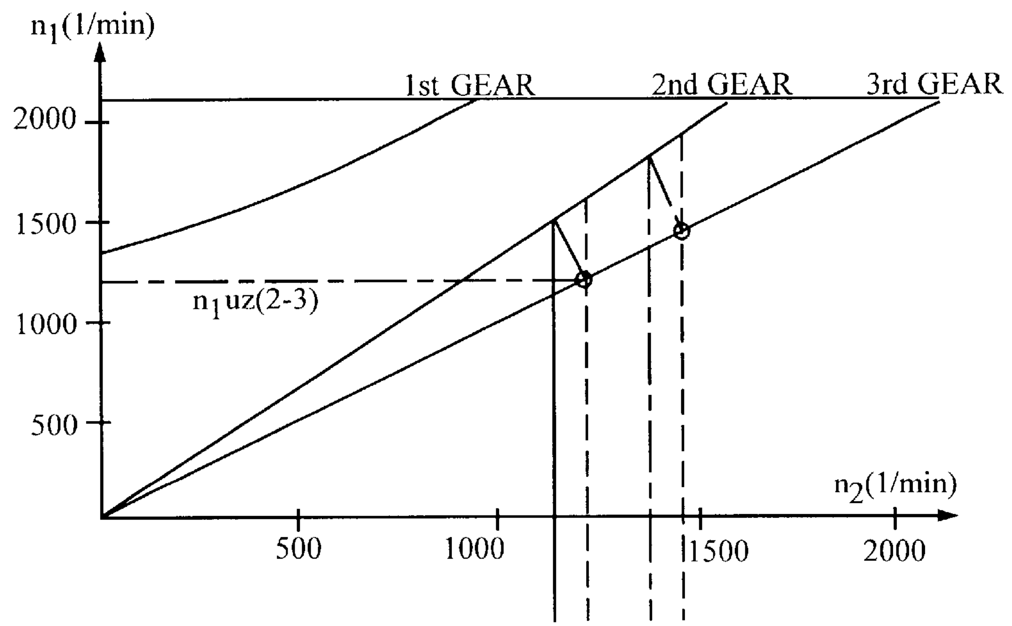
FIG. 7*a* is a diagram showing motor speed $n_1$ vs. output speed $n_2$ illustrating an example according to a method of the invention with different characteristic slope for hilly terrains or for travel on a flat terrain.
Figure 7B:
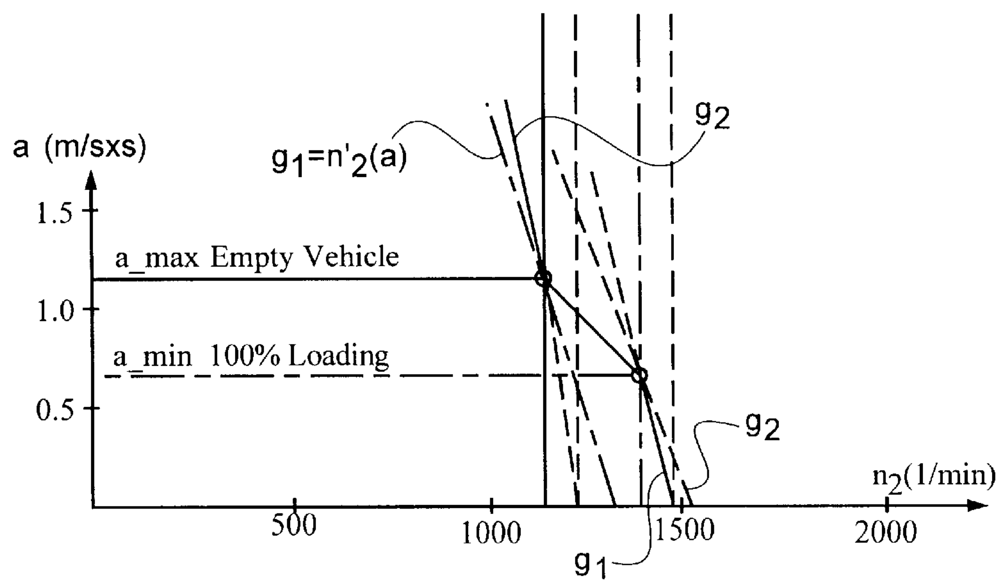
FIG. 7*b* is a diagram showing vehicle acceleration a vs. output speed $n_2$ also illustrating the example shown in FIG. 7*a* with different characteristic slope for hilly terrains or for travel on a flat terrain.
Figure 8:
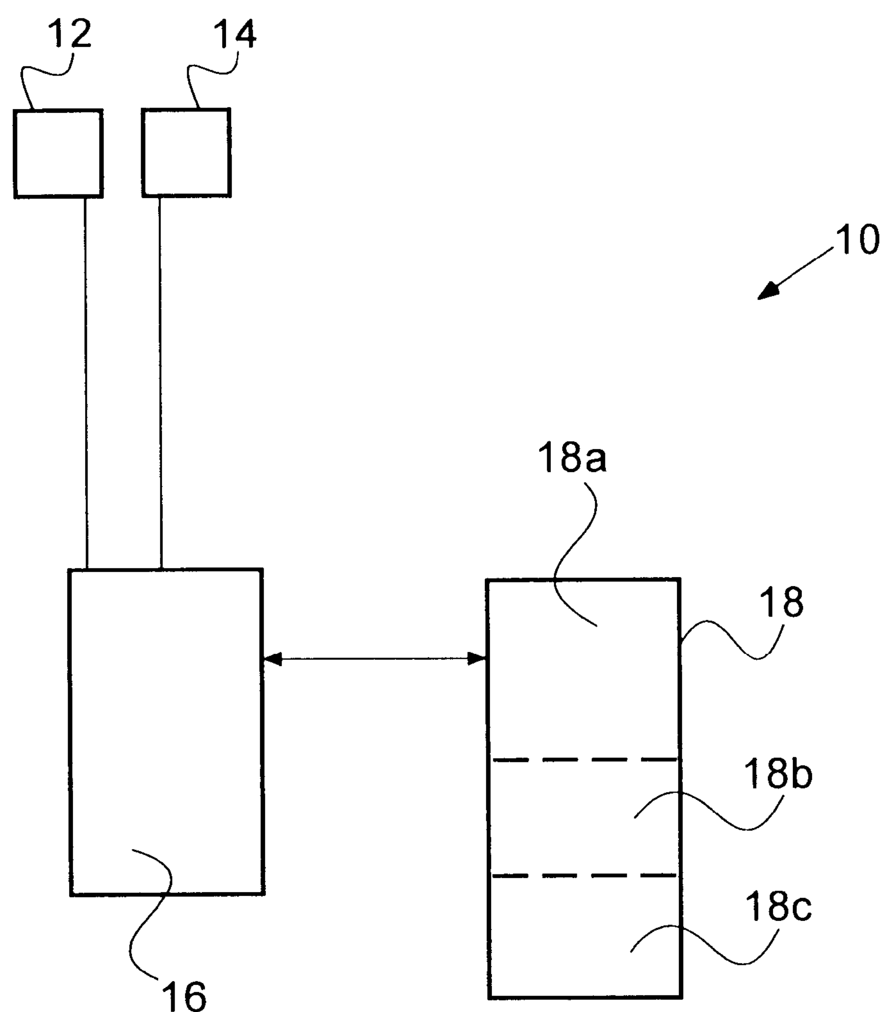
FIG. 8 is a block diagram illustration of a control device in accordance with a preferred embodiment of the invention.

Thus, in a further embodiment according to the invention, not only the acceleration values are included in the shifting process, but also the engine connection rpm after the shifting process. This can again be entered into a memory of the control equipment. With the aid of the stored motor connection rpm values that are obtained during the travel with adjusted a_max, a_min, the slope $n'_1$=g of the acceleration/driven rpm characteristic $n_1(a)_U$ formed as a straight line, can be chosen in such a way that, in all or the majority of the shifting processes that occur during driving, the minimum connection rpm $n_{1UZ}$ is always reached. In this way, for example, all noise in the vehicle is prevented. In the example shown in FIG. 7*b*, two acceleration/driven rpm lines $g_1$ and $g_2$ are shown for an empty vehicle. The characteristic $g_1$ can, for example, stand again for use in a hilly terrain, while the characteristic $g_2$ for use in a flat terrain. With the same predetermined acceleration, in this example, the vehicle switches at a higher driven rpm in a hilly terrain than on a flat terrain. This ensures that, in a hilly terrain, due to the higher shifting rpm $n_1$, the same target rpm $n_{1UZ(2-3)}$ is achieved at the same acceleration as on a flat terrain.

As in the case of adaptation of a_min and a_max, one can also provide adaptation of the slope of the straight line $g_1$ and $g_2$ during the drive itself.

For this purpose, again, an averaging is carried out over the values that are read in and, correspondingly, a change is made in the slope of the characteristic.

Thus, with methods and apparatus of the present invention, it is now possible for the first time to maintain an optimum shifting characteristic from the point of view of fuel behavior, in spite of different back-axle-drive ratios. Furthermore, methods and apparatus of the invention provide possibilities to change the shifting behavior of the vehicle for completely different use conditions, so that an optimum fuel behavior of the vehicle is always achieved.

The foregoing detailed description is given for clearness of understanding only, and no unnecessary limitations should be understood therefrom, as modifications within the scope of the invention will be apparent to those skilled in the art.

We claim:

1. A method for the control of shifting processes in a vehicle transmission from an initial gear to the next higher target gear, the method comprising the following steps:

a) continuously determining the acceleration (a) of the vehicle;

b) continuously determining a driven rpm ($n_2$) behind the vehicle transmission;

c) initiating a shifting process when the acceleration value (a) and the driven rpm value ($n_2$) fall on a switch point which lies on a shifting characteristic ($n_2(a)$) in an acceleration-driven rpm diagram, whereby the shifting characteristic ($n_2(a)$) has a stepped course with at least two break points (a_max; a_min) and the slope of the shifting characteristics for the acceleration values $a\_min<a<a\_max$ is always smaller than or equal to the slope of the shifting characteristic for acceleration values $a \leqq a\_min$ or $a \geqq a\_max$, that is, the following always applies:

$|n_2(a_1)| \leqq |n_2(a_2)|$ where $a_1 \in [a\_min<a<a\_max]$ and $a_2 \in ]a\_max<a<\infty[$ or $a_2 \in [0<a<a\_min[$ and wherein, when the vehicle transmission is connected with different axle-drive ratios, the shifting characteristic ($n_2(a)$) with break points (a_max; a_min) is the same for all possible axle-drive ratios.

2. The method of claim 1 wherein the shifting characteristic for all possible ratios is the shifting characteristic for the lowest of the possible axle-drive ratios with break points $a\_max_{smallest,\ axle\text{-}drive\ ratio}$ and $a\_min_{smallest\ axle\text{-}drive\ ratio}$.

3. The method of claim 1 wherein one of at least two break points, the break point a_max, can be determined by the fact that a_max is the maximum achievable acceleration of the essentially empty vehicle traveling on an essentially flat terrain before triggering the shifting process.

4. The method of claim 1 wherein one of at least two break points, the break point a_min, can be determined by the fact that a_min is the maximum achievable acceleration of the essentially fully occupied vehicle before the initiation of the shifting process when traveling on an essentially flat terrain.

5. The method of claim 1 wherein the acceleration values at which the shifting processes are initiated are recorded in order to obtain a shifting point frequency distribution.

6. The method of claim 5 wherein the shifting characteristic with break points a_max and a_min is adapted in such a way that a mean value of the shifting point frequency distribution $\overline{S}$ lies between a_max and a_min.

7. The method of claim 6 wherein the mean value $\overline{S}$ of the shifting point frequency distribution is in a middle between a_max and a_min.

8. The method of claim 1 wherein an engine connection rpm is recorded after the shifting process in order to obtain an engine connection rpm distribution.

9. The method of claim 8 wherein a slope $n'_1(a)$ of characteristic $n_1(a)$ with a predetermined a_max is chosen so that in a predominant majority of the shifting processes, at least a target rpm $n_{1UZ}$ is reached.

10. The method of claim 9 wherein in 90% of all shifting processes, when averaged over a total number of shifting processes, where the total number is greater than 10, the target rpm $n_{1UZ}$ is reached after the shifting process.

11. A method for the control of shifting processes of a vehicle transmission from an initial gear into the next highest target gear, the method comprising the following steps:

a) continuously determining the acceleration (a) of the vehicle;

b) continuously determining a driven rpm ($n_2$) behind the vehicle transmission;

c) initiating a shifting process when the acceleration value (a) and the driven rpm value ($n_2$) fall on a switch point which lies on a shifting characteristic ($n_2(a)$) in an acceleration-driven rpm diagram, the shifting characteristic ($n_2(a)$) having a stepped course with at least two break points (a_max; a_min) and the slope of the shifting characteristics for acceleration values $a\_min<a<a\_max$ always being smaller than or equal to the slope of the shifting characteristic for acceleration values $a \leqq a\_min$ or $a \geqq a\_max$, that is, the following is always true:

$|n_2(a_1)| \leqq |n_2(a_2)|$ where $a_1 \in [a\_min<a<a\_max]$ and $a_2 \in ]a\_max<a<\infty[$ or $a_2 \in [0<a<a\_min[$.

and wherein the acceleration values at which the shifting processes are initiated are recorded in order to obtain a switch point frequency distribution.

12. The method of claim 11 wherein the shifting characteristic with break points a_max and a_min is adapted in such a way that a mean value of the switch point frequency distribution $\overline{S}$ lies between a_max and a_min.

13. The method of claim 12 wherein the mean value $\overline{S}$ of the switch point frequency distribution is in a middle between a_max and a_min.

14. The method of claim 11 wherein an engine connection rpm is recorded after the shifting process in order to obtain an engine connection rpm distribution.

15. The method of claim 14 wherein a slope $n'_1(a)$ of characteristic $n_1(a)$ for a predetermined a_max is chosen so that at least a minimum target rpm $n_{1UZ}$ is reached in the majority of the shifting processes.

16. The method of claim 15 wherein in about 90% of all shifting processes, when averaged over a total number of shifting processes, where the total number is >10, at least the target rpm $n_{1UZ}$ is reached.

17. A control device for a vehicle transmission comprising:

a) means for recording acceleration of the vehicle;

b) means for recording driven rpm of the vehicle;

c) a plurality of memory regions, wherein, in one of the memory regions, a shifting characteristic $n_2(a)$ is stored, which has a stepped course with at least two break points a_max and a_min and the slope of the characteristic for acceleration values $a\_min<a<a\_max$ is always smaller than or equal to the slope of the shifting characteristic for acceleration values $a \leqq a\_min$ or $a \geqq a\_max$, that is, the following always applies:

$|n_2(a_1)| \leqq |n_2(a_2)|$ where $a_1 \in [a\_min<a<a\_max]$ and $a_2 \in ]a\_max<a<\infty[$ or $a_2 \in [0<a<a\_min[$ d) means for triggering a shifting process when the recorded acceleration and the driven rpm lie on a switch point of the shifting characteristic;

e) another memory region for storing the acceleration shifting values before the shifting process and/or the driving rpm values after the shifting process;

f) means for reaching the mean value of the stored acceleration shifting value and/or driving rpm values; and g) means for adapting the characteristic to the mean value of the stored acceleration shifting values and/or driving rpm value.

* * * * *